United States Patent
Zhu et al.

(10) Patent No.: US 10,137,408 B2
(45) Date of Patent: Nov. 27, 2018

(54) EQUIPMENT AND METHOD FOR CIRCULATING FLUIDIZED BED SEMIDRY SIMULTANEOUS DESULFURIZATION AND DENITRATION OF SINTERING FLUE GAS

(71) Applicants: INSTITUTE OF PROCESS ENGINEERING, CHINESE ACADEMY OF SCIENCES, Beijing (CN); BEIJING ZSTC ENVIRONMENTAL ENGINEERING CO., LTD., Beijing (CN)

(72) Inventors: Tingyu Zhu, Beijing (CN); Wenqing Xu, Beijing (CN); Ruizhuang Zhao, Beijing (CN); Meng Ye, Beijing (CN); Jin Xiong, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 2 days.

(21) Appl. No.: 15/327,699

(22) PCT Filed: Aug. 11, 2014

(86) PCT No.: PCT/CN2014/084110
§ 371 (c)(1),
(2) Date: Jan. 20, 2017

(87) PCT Pub. No.: WO2016/011681
PCT Pub. Date: Jan. 28, 2016

(65) Prior Publication Data
US 2017/0203253 A1    Jul. 20, 2017

(30) Foreign Application Priority Data
Jul. 21, 2014 (CN) .......................... 2014 1 0347174

(51) Int. Cl.
*B01D 53/60* (2006.01)
*B01D 53/80* (2006.01)
(Continued)

(52) U.S. Cl.
CPC ............. *B01D 53/60* (2013.01); *B01D 45/16* (2013.01); *B01D 53/1425* (2013.01);
(Continued)

(58) Field of Classification Search
None
See application file for complete search history.

(56) References Cited

FOREIGN PATENT DOCUMENTS

| CN | 102228784 A | 11/2011 |
|---|---|---|
| CN | 102228788 A | 11/2011 |

(Continued)

OTHER PUBLICATIONS

Patent Cooperation Treaty (PCT), International Search Report and Written Opinion for Application PCT/CN2014/084110 filed Aug. 11, 2014, dated Apr. 27, 2017, International Searching Authority, CN.

*Primary Examiner* — Sheng H Davis
(74) *Attorney, Agent, or Firm* — McDonald Hopkins LLC

(57) ABSTRACT

Equipment and a method for circulating fluidized bed semi-dry simultaneous desulfurization and denitration of a sintering flue gas, comprising an ozone generator (2), a diluting blower (1), a mixing buffer tank (3), an ozone distributor (4), and a circulating fluidized bed (CFB) reactor tower (9). When evenly mixed by the mixing buffer tank (3), ozone is injected into a flue (4') via the ozone distributor (4); and, an oxidized flue gas is introduced into the CFB reactor tower (9), where NOx, $SO_2$, and $SO_3$ in the flue gas are reacted with a Ca-based absorbent under the action of atomized water in the reactor tower, thus implementing simultaneous removal of $SO_x$ and NOx. This provides the characteristics
(Continued)

of a simple system, great performance, small footprint, and inexpensive investments.

13 Claims, 1 Drawing Sheet

(51) Int. Cl.
  *B01D 53/75* (2006.01)
  *B01D 45/16* (2006.01)
  *B01D 53/14* (2006.01)
  *B01D 53/34* (2006.01)
  *B01D 53/83* (2006.01)
(52) U.S. Cl.
  CPC ..... *B01D 53/1431* (2013.01); *B01D 53/1481* (2013.01); *B01D 53/346* (2013.01); *B01D 53/75* (2013.01); *B01D 53/80* (2013.01); *B01D 53/83* (2013.01); *B01D 2251/104* (2013.01); *B01D 2251/404* (2013.01); *B01D 2257/302* (2013.01); *B01D 2257/40* (2013.01); *B01D 2257/404* (2013.01); *B01D 2258/025* (2013.01); *B01D 2258/0283* (2013.01); *Y02A 50/2344* (2018.01); *Y02A 50/2348* (2018.01)

(56) References Cited

FOREIGN PATENT DOCUMENTS

| | | |
|---|---|---|
| CN | 102614747 A | 8/2012 |
| CN | 103041693 A | 4/2013 |
| CN | 103566725 A | 2/2014 |
| CN | 203447967 U | 2/2014 |
| EP | 1193444 A1 | 4/2002 |
| JP | 551849 A | 1/1980 |
| JP | 58098124 | 6/1983 |
| JP | 06170165 | 6/1994 |
| JP | 06262038 | 9/1994 |
| WO | 2007035169 A1 | 3/2007 |

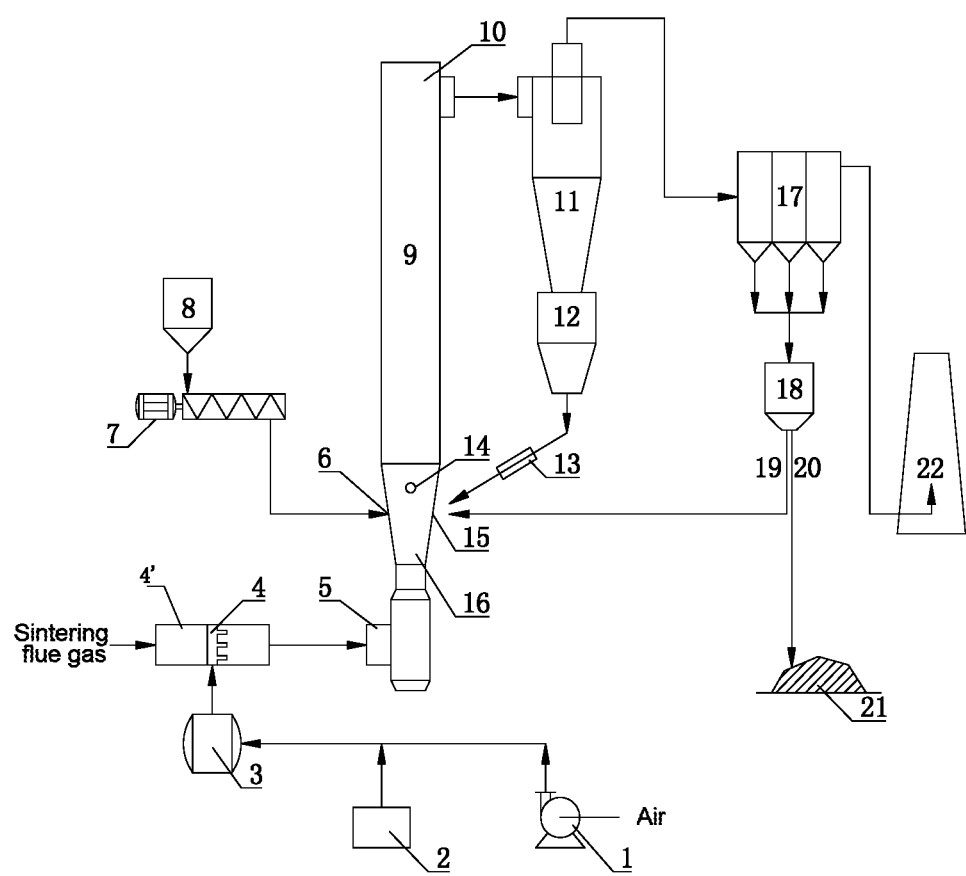

EQUIPMENT AND METHOD FOR CIRCULATING FLUIDIZED BED SEMIDRY SIMULTANEOUS DESULFURIZATION AND DENITRATION OF SINTERING FLUE GAS

CROSS-REFERENCE TO RELATED APPLICATION

This application is a 35 U.S.C. 371 national stage filing of PCT Application No. PCT/CN2014/084110, filed on Aug. 11, 2014, which claims priority to Chinese Patent Application No. 201410347174.5, filed on Jul. 21, 2014, both of which are incorporated herein in their entirety by reference.

TECHNICAL FIELD

The present invention relates to the flue gas cleaning field, specifically to equipment and method for combined desulfurization and denitration of sintering flue gas by circulating fluidized bed semidry process in the iron and steel industry.

BACKGROUND ART

In China, emissions of pollutants, such as sulfur dioxide, nitrogen oxides and others in the iron and steel industry ranked the forefront of the industry. More than 50% of $SO_2$ and $NO_x$ emitted in the iron and steel industry are from the sintering process. The *"Emission standard of air pollutants for sintering and pelletizing of iron and steel industry"* issued in 2012 puts forward higher requirements for the emissions of $SO_2$ and $NO_x$.

As seen from economic benefits and application prospects, it is the most practical significance that the purification technology can achieve combined removal of $SO_2$ and $NO_x$. As seen from enterprise researches and literature reports, the dry purification technology can achieve the purpose of combined removal. For example, the active coke desulfurization and denitration technology shows greater technical advantages, which produces no secondary pollution, and has received enough attention in recent years. But due to the performance of dry raw materials and excessive economic costs, the promotion thereof is subject to a certain constraint. There are a lot of reports of desulfurization and denitration purification technology, in which NO in flue gas is oxidized to $NO_x$ having a high valence, and then reacts with basic absorbent. During the contact process of flue gas and oxidant, $SO_2$ will inevitably and partially be oxidized to $SO_3$. However, $SO_3$ cannot be effectively removed by wet removal process, resulting in the transformation of sulfur dioxide pollutant morphology, and the final removal cannot be achieved.

Relevant experts and scholars put forward semidry process combined removal method. From a technical point of view, the method for flue gas desulfurization by circulating fluidized bed semidry process has been quite mature. On the basis of that, it is a development trend at home and abroad to conduct technical upgrades and develop combined desulfurization and denitration technology.

DISCLOSURE OF THE INVENTION

In view of the defects of the development of present semidry process combined removal technology, the object of the present invention lies in providing equipment for combined desulfurization and denitration of sintering flue gas by circulating fluidized bed semidry process. The equipment of the present invention has a simple system, small floor area, less investment and operating costs.

In order to achieve the aforesaid object, the present invention discloses the following technical solution.

The present invention discloses equipment for combined desulfurization and denitration of sintering flue gas by circulating fluidized bed semidry process, comprising an ozone generator 2, a diluting blower 1, a mixing buffer tank 3, an ozone distributor 4 and a circulating fluidized bed reaction tower 9;

the ozone generator 2 and diluting blower 1 are connected with an inlet of the mixing buffer tank 3;

the ozone distributor 4 is mounted in a flue 4', and a connection port is set outside the flue 4' and connected with an outlet of the mixing buffer tank 3;

a flue gas inlet 5 of the circulating fluidized bed reaction tower 9 is connected with the flue 4' arranged with the ozone distributor 4.

The ozone distributor 4 can make ozone produced in the ozone generator 2 be homogeneously distributed in the flue 4', so as to increase the oxidation efficiency and reduce the ozone loss to a maximum extent. The ozone distributor can be manufactured by using the technologies disclosed in the prior art, e.g. the inventions having the application No. 201410059167.5 and No. 201410066906.3.

The circulating fluidized bed reaction tower 9 may be shortened as a CFB reaction tower.

Preferably, the flue 4' distance between the position of the ozone distributor 4 location and the flue gas inlet 5 of the circulating fluidized bed reaction tower 9 is 15-30 m.

The sintering flue gas is fed into the flue 4' arranged with the ozone distributor 4, oxidized by ozone gas produced in the ozone generator 2. Part or all of NO in the flue gas is oxidized to $NO_x$ having a high valence, and part of $SO_2$ will be oxidized to $SO_3$ at the same time. The oxidized flue gas is fed into the circulating fluidized bed reaction tower 9 via the flue gas inlet 5 of the circulating fluidized bed reaction tower, and reacted with Ca-base absorbent under the action of atomized water to remove $SO_2$, $SO_3$ and $NO_x$ having a high valence in the flue gas.

As for the equipment of the present invention, an upper outlet 10 of the circulating fluidized bed reaction tower 9 is connected with a cyclone separator 11, and a separating hopper 12 of the cyclone separator 11 is connected with a return port 15 of the circulating fluidized bed reaction tower 9.

The cyclone separator 11 is used to separate Ca-base absorbent from the flue gas and return the absorbent to the circulating fluidized bed reaction tower 9 via the return port 15 of the circulating fluidized bed reaction tower 9 for further reaction.

Preferably, the upper outlet 10 of the circulating fluidized bed reaction tower 9 is tangentially connected with the cyclone separator 11.

Preferably, an outlet of the separating hopper 12 of the cyclone separator 11 is connected via an air chute 13 with the return port 15 of the circulating fluidized bed reaction tower 9.

As for the equipment of the present invention, the bottom of the circulating fluidized bed reaction tower 9 has a Venturi structure, wherein the expansion section 16 of the Venturi structure is provided with a feed inlet 6, a return port 15 and a water spray gun 14; and the nozzles of the gun 14 are installed in the direction of the flue gas downstream.

As for the equipment of the present invention, the cyclone separator 11 is connected with a bag filter 17; the hopper of the bag filter 17 is connected with an ash bin 18; the ash bin 18 is provided with two outlets, wherein the first outlet 19 is connected with the return port 15 of the circulating fluidized bed reaction tower 9 via a pneumatic conveying pipe; the returning of the bag filter 17 aims to stabilize the bed pressure and achieve further circulation of absorbents; the second outlet 20 is connected with an ash silo 21 to achieve discharging.

Preferably, a chimney 22 is set up after the bag filter 17 to discharge the flue gas after desulfurization and denitration. The flue gas is discharged via the chimney 22 after further dust removal by the bag filter 17.

The second object of the present invention lies in providing a method for removing multi-pollutants by the aforesaid equipment for combined desulfurization and denitration of sintering flue gas by circulating fluidized bed semidry process, comprising the following steps of:

1) injecting ozone into the flue 4' arranged with the ozone distributor 4, to make ozone react with flue gas, wherein part of $SO_2$ in the flue gas is oxidized to $SO_3$, part or all of NO is oxidized to $NO_x$ having a high valence; and 2) feeding the oxidized flue gas into the circulating fluidized bed reaction tower 9, reacting $SO_2$, $SO_3$ and $NO_x$ in the flue gas with Ca-base absorbent in the reaction tower 9 under the action of atomized water to remove.

As for the method of the present invention, the process in step 1) is that: ozone produced in the ozone generator 2 is homogeneously mixed in the mixing buffer tank 3 under the action of the diluting blower 1 and injected into the flue 4' via the ozone distributor 4, and ozone injected therein is fully contacted and reacts with the flue gas.

Preferably, the injected ozone and NO in the flue gas have a molar ratio of 0.25-1.2, e.g. 0.26-1.49, 0.45-1.15, 0.55-1.05 and the like; the reaction lasts for 0.5-5 s, e.g. 0.6-4.9 s, 1.0-3.5 s, 1.5-2.5 s, 2 s and the like; the Ca-base absorbent in step 2) is added in a Ca/(S+N) ratio of 1.1-2.0, e.g. 1.11-1.96, 1.3-1.8, 1.42-1.67, 1.53 and the like, preferably 1.2-1.5. The concentrations of sulfur oxides and nitrogen oxides in the treated flue gas can be controlled by adjusting the addition amount of the Ca-base absorbent.

As for the method of the present invention, the reacted Ca-base absorbent in step 2) is separated out by the cyclone separator 11, passes through the air chute 13 and returns to the circulating fluidized bed reaction tower 9 to achieve multiple circulation. After further removing dust via the bag filter 17, the flue gas is discharged into air. The dust part collected via the bag filter 17 is fed back to the circulating fluidized bed reaction tower 9 by pneumatic conveying, which can stabilize the bed pressure and achieve further circulation of the absorbent.

Preferably, the flue gas temperature inside the circulating fluidized bed reaction tower 9 is controlled above the acid dew point by adjusting the water spray amount of the water spray gun 14, generally 75-80° C., e.g. 76° C., 77° C., 79° C. and the like. By adjusting the circulating return amount of the air chute 13 and controlling the pressure difference between the inlet and outlet of the circulating fluidized bed reaction tower 9, the particle concentration in the tower is controlled and the requirement on the Ca/(S+N) molar ratio is met.

The present invention adjusts the water spray amount according to the flue gas temperature at the outlet 10 of the circulating fluidized bed reaction tower 9, ensuring that the temperature inside the circulating fluidized bed reaction tower is kept above the dew point of the flue gas.

One preferred embodiment of the method in the present invention is that, when the molar ratio of ozone to NO is 1.0; the reaction time is 1 s; and Ca/(S+N) molar ratio is 1.2, the desulfurization and denitration efficiency may reach 90% or more.

As compared to the prior art, the present invention has the following advantages:

1) Simple system, small floor area, and less investment and operating costs.

2) Through the oxidation of ozone, NO which is not easily absorbed by the absorbent is oxidized to $NO_x$ having a high valence, and may react with $SO_x$ (including $SO_2$ and $SO_3$) during the subsequent removal process by circulating-fluidized bed semi-dry process, without any need of independent denitration equipment. Meanwhile, there is no problem that $SO_3$ cannot be removed.

3) The materials collected from the cyclone separator and bag filter are fed back to the reaction tower, to achieve external circulation outside the tower of the absorbent and to increase the utilization efficiency of the absorbent.

4) Higher $SO_2$ and NO removal efficiency. Under excellent operating conditions, the desulfurization efficiency of the flue gas desulfurization technology by circulating fluidized bed semidry process may reach 90% or more. The oxidization rate of NO by $O_3$ in the flue gas is very fast, and the denitration efficiency may reach 90% or more.

DESCRIPTION OF THE DRAWINGS

FIG. 1 shows a flow chart of the present invention, wherein: 1—diluting blower; 2—ozone generator; 3—mixing buffer tank; 4—ozone distributor; 4'—flue; 5—bottom inlet of circulating fluidized bed reaction tower; 6—feeding inlet; 7—spiral conveyor; 8—absorbent silo; 9—circulating fluidized bed reaction tower; 10—upper outlet of circulating fluidized bed reaction tower; 11—cyclone separator; 12—hopper of cyclone separator; 13—air chute; 14—water spray gun; 15—return port; 16—expansion section of Venturi structure; 17—bag filter; 18—ash bin; 19—first outlet; 20—second outlet; 21—ash silo; 22—chimney.

The present invention is further stated as follows in detail. However, the following examples are just simple examples of the present invention, and do not represent or limit the protection scope of the present invention. The protection scope of the present invention is based on the claims.

EMBODIMENTS

In order to better understand the present invention, the present invention lists the following examples. Those skilled in the art shall know that the examples are merely used to understand the present invention, and shall not be regarded any specific limits to the present invention.

Example 1

Equipment for combined desulfurization and denitration of sintering flue gas by the circulating fluidized bed semidry process comprises an ozone generator 2, a mixing buffer tank 3, an ozone distributor 4 and a circulating fluidized bed reaction tower 9. The ozone generator 2 and diluting blower 1 are connected with an inlet of the mixing buffer tank 3. The bottom inlet 5 of the CFB reaction tower is connected with a flue 4' arranged with the ozone distributor 4. The ozone distributor 4 is mounted in the flue 4', and a connection port is set outside the flue 4' and connected with an outlet of the mixing buffer tank 3.

A method for removing multi-pollutants by using the equipment for combined desulfurization and denitration of sintering flue gas by the circulating fluidized bed semidry process comprises the following steps of:

1) injecting ozone into the flue, wherein $SO_2$ in the flue gas is partially oxidized to $SO_3$, and NO is oxidized partially or completely oxidized to $NO_x$ having a high valence; and
2) feeding the oxidized flue gas into the circulating fluidized bed reaction tower 9, reacting $SO_2$, $SO_3$ and $NO_x$ in the flue gas with Ca-base absorbent in the reaction tower under the action of atomized water to remove.

In step 1), the molar ratio of the injected ozone and NO in the flue gas is controlled at 0.25, and the reaction lasts for 0.5 s.

In step 2), the Ca-base absorbent is added in a Ca/(S+N) molar ratio of 1.2.

In the present invention, the concentrations of sulfur oxide and nitrogen oxide in the treated flue gas are controlled by adjusting the additional amount of the Ca-base absorbent. The water spray amount is adjusted according to the temperature of the flue gas at the outlet 10 of the circulating fluidized bed reaction tower 9, to ensure the temperature inside the tower above the dew point of the flue gas, wherein, preferably, the lowest temperature is controlled between 75-80° C. By adjusting the circulating return amount, the solid particle concentration inside the circulating fluidized bed reaction tower 9 is controlled. The desulfurization efficiency of the equipment is not less than 90%, and the denitration efficiency is not less than 20%.

Example 2

Equipment for combined desulfurization and denitration of sintering flue gas by the circulating fluidized bed semidry process comprises, in sequence, a flue 4', a circulating fluidized bed reaction tower 9, a cyclone separator 11, and a bag filter 17. The flue 4' is connected with an ozone mixing buffer tank 3, and an ozone generator 2 and a diluting blower 1 are connected with the ozone mixing buffer tank 3. An ozone distributor 4 is mounted in the flue 4', and a connection port is set outside the flue 4' and connected with an outlet of the mixing buffer tank 3.

An upper outlet 10 of the circulating fluidized bed reaction tower is tangentially connected with the cyclone separator 11; and an outlet of a separating hopper 12 of the cyclone separator is connected via an air chute 13 with a return port 15 of the circulating fluidized bed reaction tower.

The cyclone separator 11 is connected with the bag filter 17. The hopper of the bag filter 17 is connected with an ash bin 18; the ash bin 18 is provided with two outlets, wherein the first outlet 19 is connected with the return port 15 of the circulating fluidized bed reaction tower 9 via a pneumatic conveying pipe; and the second outlet achieves discharging. The flue is fed into a chimney 22 after further dust removal by the bag filter 17.

The bottom of the circulating fluidized bed reaction tower 9 has a Venturi structure, wherein the expansion section 16 of the Venturi structure is provided with a feed inlet 6, a return port 15 and a water spray gun 14, and the nozzles of the gun 14 are installed in the direction of the flue gas downstream.

A method for removing multi-pollutants by using the equipment for combined desulfurization and denitration of sintering flue gas by the circulating fluidized bed semidry process above comprises the following steps of:

1) injecting ozone into the flue, wherein $SO_2$ in the flue gas is partially oxidized to $SO_3$, and NO is oxidized partially or completely oxidized to $NO_x$ having a high valence; and
2) feeding the oxidized flue gas into the circulating fluidized bed reaction tower 9, reacting $SO_2$, $SO_3$ and $NO_x$ in the flue gas with Ca-base absorbent in the reaction tower under the action of atomized water to remove.

In step 1), the molar ratio of the injected ozone and NO in the flue gas is controlled at 0.5, and the reaction lasts for 1.0 s.

In step 2), the Ca-base absorbent is added in a Ca/(S+N) molar ratio of 1.3.

In the present invention, the concentrations of sulfur oxide and nitrogen oxide in the treated flue gas are controlled by adjusting the additional amount of the Ca-base absorbent. The water spray amount is adjusted according to the temperature of the flue gas at the outlet 10 of the circulating fluidized bed reaction tower 9, to ensure the temperature inside the tower above the dew point of the flue gas, wherein, preferably, the lowest temperature is controlled between 75-80° C. By adjusting the circulating return amount, the solid particle concentration inside the circulating fluidized bed reaction tower 9 is controlled. The desulfurization efficiency of the equipment is not less than 90%, and the denitration efficiency is not less than 40%.

Example 3

Equipment for combined desulfurization and denitration of sintering flue gas by the circulating fluidized bed semidry process comprises, in sequence, a flue 4', a circulating fluidized bed reaction tower 9, a cyclone separator 11, and a bag filter 17. The flue 4' is connected with an ozone mixing buffer tank 3, and an ozone generator 2 and a diluting blower 1 are connected with the ozone mixing buffer tank 3. An ozone distributor 4 is mounted in the flue 4', and a connection port is set outside the flue 4' and connected with an outlet of the mixing buffer tank 3.

The flue distance between the position of the ozone distributor 4 location and the flue gas inlet 5 of the circulating fluidized bed reaction tower is 15 m.

An upper outlet 10 of the circulating fluidized bed reaction tower is tangentially connected with the cyclone separator 11; and an outlet of a separating hopper 12 of the cyclone separator is connected via an air chute 13 with the return port 15 of the circulating fluidized bed reaction tower.

The cyclone separator 11 is connected to the bag filter 17. The hopper of the bag filter 17 is connected with an ash bin 18; the ash bin 18 is provided with two outlets, wherein the first outlet 19 is connected with the return port 15 of the circulating fluidized bed reaction tower 9 via a pneumatic conveying pipe; and the second outlet 20 achieves discharging. The flue is fed into a chimney 22 after further dust removal by the bag filter 17.

A method for removing multi-pollutants by using the equipment for combined desulfurization and denitration of sintering flue gas by the circulating fluidized bed semidry process above comprises the following steps of:

1) injecting ozone into the flue, wherein $SO_2$ in the flue gas is partially oxidized to $SO_3$, and NO is oxidized partially or completely oxidized to $NO_x$ having a high valence; and
2) feeding the oxidized flue gas into the circulating fluidized bed reaction tower 9, reacting $SO_2$, $SO_3$ and NO$_x$ in the flue gas with Ca-base absorbent in the reaction tower under the action of atomized water to remove.

In step 1), the molar ratio of the injected ozone and NO in the flue gas is controlled at 1.0 and the reaction lasts for 5.0 s.

In step 2), the Ca-base absorbent is added in a Ca/(S+N) molar ratio of 1.5.

In the present invention, the concentrations of sulfur oxide and nitrogen oxide in the treated flue gas are controlled by adjusting the additional amount of the Ca-base absorbent. The water spray amount is adjusted according to the temperature of the flue gas at the outlet 10 of the circulating fluidized bed reaction tower 9, to ensure the temperature inside the tower above the dew point of the flue gas, wherein, preferably, the lowest temperature is controlled between 75-80° C. By adjusting the circulating return amount, the solid particle concentration inside the circulating fluidized bed reaction tower 9 is controlled. The desulfurization efficiency of the equipment is not less than 90%, and the denitration efficiency is not less than 90%.

Example 4

Equipment for combined desulfurization and denitration of sintering flue gas by the circulating fluidized bed semidry process comprises, in sequence, a flue 4', a circulating fluidized bed reaction tower 9, a cyclone separator 11, and a bag filter 17. The flue 4' is connected with an ozone mixing buffer tank 3, and an ozone generator 2 and a diluting blower 1 are connected with the ozone mixing buffer tank 3. The ozone distributor 4 is mounted in the flue 4', and a connection port is set outside the flue 4' and connected with an outlet of the mixing buffer tank 3.

The flue distance between the position of the ozone distributor 4 location and the flue gas inlet 5 of the circulating fluidized bed reaction tower is 30 m.

The cyclone separator 11 is connected with the bag filter 17. The hopper of the bag filter 17 is connected with an ash bin 18; the ash bin 18 is provided with two outlets, wherein the first outlet 19 is connected with the return port 15 of the circulating fluidized bed reaction tower 9 via a pneumatic conveying pipe; and the second outlet 20 achieves discharging. The flue is fed into a chimney 22 after further dust removal by the bag filter 17.

A method for removing multi-pollutants by using the equipment for combined desulfurization and denitration of sintering flue gas by the circulating fluidized bed semidry process above comprises the following steps of:

1) injecting ozone into the flue, wherein SO$_2$ in the flue gas is partially oxidized to SO$_3$, and NO is oxidized partially or completely oxidized to NO$_x$ having a high valence; and
2) feeding the oxidized flue gas into the circulating fluidized bed reaction tower 9, reacting SO$_2$, SO$_3$ and NO$_x$ in the flue gas with Ca-base absorbent in the reaction tower under the action of atomized water to remove.

In step 1), the molar ratio of the injected ozone and NO in the flue gas is controlled at 1.2, and the reaction lasts for 3.5 s.

In step 2), the Ca-base absorbent is added in a Ca/(S+N) molar ratio of 2.0.

In the present invention, the concentrations of sulfur oxide and nitrogen oxide in the treated flue gas are controlled by adjusting the additional amount of the Ca-base absorbent. The water spray amount is adjusted according to the temperature of the flue gas at the outlet 10 of the circulating fluidized bed reaction tower 9, to ensure the temperature inside the tower above the dew point of the flue gas, wherein, preferably, the lowest temperature is controlled between 75-80° C. By adjusting the circulating return amount, the solid particle concentration inside the circulating fluidized bed reaction tower 9 is controlled. The desulfurization efficiency of the equipment is not less than 90%, and the denitration efficiency is not less than 90%.

The present invention discloses the detailed structural features and the method for removing pollutants via the aforesaid examples. However, the present invention is not limited by the aforesaid detailed structural features and the method for removing pollutants. That is to say, it does not mean that the present invention cannot be carried out unless the aforesaid detailed structural features and the method for removing pollutants is used. Those skilled in the art shall know that any improvement, equivalent replacement of the parts of the present invention, addition of auxiliary parts, selection of specific modes and the like all fall within the protection scope and disclosure of the present invention.

The above has detailedly stated the preferred embodiments of the present invention. However, the present invention is not limited by any specific details in the aforesaid embodiments. Within the scope of the technical concept of the present invention, many simple deformations may be made to the technical solution of the present invention, wherein said simple deformations all fall within the protection scope of the present invention.

In addition, it shall be noted that various specific technical features in the aforesaid specific embodiments can be combined in any suitable manner, without any contradictions. In order to avoid unnecessary repetition, no further explanation of various possible combinations will be provided in the present invention.

Moreover, any combination of various embodiments of the present invention can also be made as long as they are not contrary to the concept of the present invention, and shall be deemed as the disclosure of the present invention.

The invention claimed is:

1. An equipment for combined desulfurization and denitration of sintering flue duct gas by circulating fluidized bed semidry process, comprising: an ozone generator (2), a diluting blower (1), a mixing buffer tank (3), an ozone distributor (4) and a circulating fluidized bed reaction tower (9);

the ozone generator (2) and diluting blower (1) are connected to an inlet of the mixing buffer tank (3);
the ozone distributor (4) is mounted in a flue duct (4'), and a connection port is set outside the flue duct (4') and connected to an outlet of the mixing buffer tank (3), wherein the connection port is contacted with the flue duct (4');
a flue duct gas inlet (5) of the circulating fluidized bed reaction tower (9) is connected to the flue duct (4') arranged with the ozone distributor (4), wherein the length of the flue duct (4') between the position of the ozone distributor (4) and the flue duct gas inlet (5) of the circulating fluidized bed reaction tower (9) is 15-30 m.

2. The equipment according to claim 1 wherein an upper outlet (10) of the circulating fluidized bed reaction tower (9) is connected with a cyclone separator (11), and a separating hopper (12) of the cyclone separator (11) is connected with a return port (15) of the circulating fluidized bed reaction tower (9).

3. The equipment according to claim 2, wherein the cyclone separator (11) is connected to a bag filter (17); the bag filter (17) is connected to an ash bin (18); the ash bin (18) is provided with a first outlet (19) and a second outlet (20), wherein the first outlet (19) is connected to the return port (15) of the circulating fluidized bed reaction tower (9) via a pneumatic conveying pipe; the second outlet (20) is connected to an ash silo (21).

4. The equipment according to claim 3, wherein a chimney is set up after the bag filter (17).

5. The equipment according to claim 2, wherein the upper outlet (10) of the circulating fluidized bed reaction tower (9) is tangentially connected with the cyclone separator (11).

6. The equipment according to claim 2, wherein an outlet of the separating hopper (12) of the cyclone separator (11) is connected via an air chute (13) with the return port (15) of the circulating fluidized bed reaction tower (9).

7. The equipment according to claim 1, wherein the circulating fluidized bed reaction tower (9) has a Venturi expansion section (16) at the bottom which is provided with a feed inlet (6), a return port (15) and a water spray gun (14), the water spray gun (14) has nozzles installed in the direction of the flue gas downstream.

8. A method for removing multi-pollutants by using the equipment according to claim 1, comprising the following steps of:
Step 1) injecting ozone into the flue duct (4') arranged with the ozone distributor (4), to make ozone react with the flue duct gas; and
Step 2) feeding the oxidized flue duct gas into the circulating fluidized bed reaction tower (9), reacting $SO_2$, $SO_3$ and NOx in the flue duct gas with Ca-base absorbent under the action of atomized water to remove.

9. The method according to claim 8, wherein the process in step 1) is that: ozone is homogeneously mixed in the mixing buffer tank (3) under the action of the diluting blower (1) and injected into the flue duct (4') via the ozone distributor (4), and ozone is fully contacted and reacts with the flue duct gas.

10. The method according to claim 9, wherein the injected ozone and NO in the flue duct gas have a molar ratio of 0.25-1.2; the reaction lasts for 0.5-5 s; the Ca-base absorbent in step 2) is added in a Ca/(S+N) ratio of 1.1-2.0.

11. The method according to claim 10, wherein the Ca-base absorbent in step 2) is added in a Ca/(S+N) ratio of 1.2-1.5.

12. The method according to claim 8 wherein the reacted Ca-base absorbent in step 2) is separated out by the cyclone separator (11), passes through the air chute (13) and returns to the circulating fluidized bed reaction tower (9) to achieve multiple circulation; the flue duct gas is discharged into air after further removing dust via the bag filter (17); the dust part collected via the bag filter (17) returns the circulating fluidized bed reaction tower (9) by pneumatic conveying.

13. The method according to claim 8, wherein the temperature of the flue duct gas in the circulating fluidized bed reaction tower (9) is controlled above the acid dew point by adjusting the water spray amount of the water spray gun (14); by adjusting the circulating return amount of the air chute (13) and controlling the pressure difference between the inlet and outlet of the circulating fluidized bed reaction tower (9), the particle concentration in the tower is controlled and the requirement on the Ca/(S+N) molar ratio is met.

* * * * *